United States Patent [19]

Turcotte et al.

[11] Patent Number: 5,290,467

[45] Date of Patent: * Mar. 1, 1994

[54] POLYCARBOXYLATE-CONTAINING ANTIFREEZE/COOLANT ADDITIVE FOR RESISTING CAVITATION EROSION-CORROSION ON ALUMINUM

[75] Inventors: David E. Turcotte, Woodhaven; James T. Lyon, Novi; John J. Conville, Canton; Shrikant V. DeSai, Grosse Ille; Stanley T. Hirozawa, Birmingham, all of Mich.

[73] Assignee: BASF Corporation, Parsippany, N.J.

[*] Notice: The portion of the term of this patent subsequent to Feb. 22, 2011 has been disclaimed.

[21] Appl. No.: 734,719

[22] Filed: Jul. 23, 1991

[51] Int. Cl.$^5$ .............................................. C09K 5/00
[52] U.S. Cl. ...................................... 252/76; 252/79; 252/396
[58] Field of Search ........................... 252/76, 79, 396

[56] References Cited

U.S. PATENT DOCUMENTS

| | | | |
|---|---|---|---|
| 3,278,585 | 10/1966 | Baker et al. | 252/79 |
| 3,948,792 | 4/1976 | Watson et al. | 252/181 |
| 4,487,712 | 12/1984 | Wilson et al. | 252/78.3 |
| 4,961,878 | 10/1990 | Mullins | 252/75 |
| 5,064,552 | 11/1991 | Oppenlaender et al. | 252/78.3 |
| 5,071,580 | 12/1991 | Little | 252/71 |
| 5,076,951 | 12/1991 | Miles et al. | 252/79 |

FOREIGN PATENT DOCUMENTS 245557 11/1987 European Pat. Off. .
1414918 11/1975 United Kingdom .

*Primary Examiner*—Christine Skane
*Attorney, Agent, or Firm*—Nixon & Vanderhye

[57] ABSTRACT

The present invention provides an antifreeze/coolant additive comprising polymeric polycarboxylates which resists cavitation erosion-corrosion of aluminum and aluminum alloys, is effective at relatively low concentrations and at varying pH.

8 Claims, No Drawings

POLYCARBOXYLATE-CONTAINING ANTIFREEZE/COOLANT ADDITIVE FOR RESISTING CAVITATION EROSION-CORROSION ON ALUMINUM

BACKGROUND OF THE INVENTION

1. Field of the Invention

This invention relates to antifreeze/coolant additives and more specifically to antifreeze/coolant additives comprising polycarboxylates which resists cavitation-corrosion of aluminum or aluminum alloys.

2. Description of the Prior Art

Antifreeze/coolant technology in North America uses silicate as a corrosion inhibitor. Silicates are particularly useful in protecting aluminum automotive cooling system components. The silicate corrosion inhibitors generally also use a phosphate, usually in the form of an alkali metal salt, to help protect metal cooling system parts and also as a buffer to control the pH of the coolant. Often phosphate salts are used to help maintain a stable alkaline environment from which multiple corrosion inhibitors can most effectively function.

Traditionally antifreeze/coolant is sold at nearly one-hundred percent glycol content. This concentrated packaging allows for flexibility so that the user can dilute the antifreeze/coolant, as needed, with available water to obtain the required freeze/boil protection. However, corrosion protection is needed over the entire dilution range.

Today, in modern automotive engineering, many engine components are fabricated from aluminum. Engine coolants, primarily ethylene glycol based solutions, must transfer heat from operating aluminum engines while inhibiting corrosion. Older automotive engines did not have aluminum components and thus, the traditional antifreeze/coolant compositions may produce cavitation erosion-corrosion of aluminum or aluminum alloy engine components. Such corrosion is very common in water pumps of gasoline and diesel engines and in cylinder liners in diesel engines.

U.S. Pat. No. 4,548,787 discloses the use of a combination water soluble phosphate with tungstate, selenate and molybdate for protection against cavitation erosion-corrosion on aluminum. U.S. Pat. No. 4,404,113 discloses the use of polyhydric alcohols as corrosion inhibiting and cavitation reducing additives for coolants.

Certain polycarboxylate type materials have been disclosed for prevention of precipitates in antifreeze/coolant compositions. For example, U.S. Pat. No. 3,663,448 discloses scale inhibition for industrial cooling waters using amino phosphonate and polyacrylic acid compounds. U.S. Pat. No. 3,948,792 discloses an aqueous additive mixture to reduce and modify the amount of silicate scale formed in automotive cooling systems.

European patent 245557 discloses the use of a variety of compounds including sodium polyacrylate to prevent alkaline earth metal silicate precipitation. U.S. Pat. No. 4,487,712 discloses the use of polyacrylic acid as a silicate stabilizer to inhibit gelation. Gelation is a silicate depletion mechanism which can occur separately from hard water precipitates.

In spite of these disclosures, there remains a need for an antifreeze/coolant additive which resists cavitation erosion-corrosion of aluminum and aluminum alloys.

SUMMARY OF THE INVENTION

The present invention has met the above-described need by providing an antifreeze/coolant additive comprising polymeric polycarboxylates which resists cavitation erosion-corrosion of aluminum and aluminum alloys. This additive is soluble in alcohol and alcohol/water mixtures, is compatible with other commonly used antifreeze/coolant components, does not corrode or damage automotive cooling systems and is effective at relatively low concentrations.

It is an object to provide antifreeze/coolant additives which resist cavitation erosion-corrosion of aluminum and aluminum alloys.

It is another object of the present invention to use polymeric polycarboxylates in silicate-phosphate type antifreeze/coolant compositions to resist cavitation erosion-corrosion of aluminum and aluminum alloys.

These and other objects of the present invention will be more fully understood from the following description of the invention.

DESCRIPTION OF THE PREFERRED EMBODIMENTS

The present invention provides an antifreeze/coolant additive comprising polymeric polycarboxylates which resist cavitation erosion-corrosion of aluminum or aluminum alloys. This additive is soluble in alcohol and alcohol/water mixtures, is compatible with other commonly used antifreeze/coolant components, does not corrode or damage automotive cooling systems and is effective at relatively low concentrations. While the emphasis in the instant application is on resistance of cavitation erosion-corrosion of aluminum, the corrosion reducing effect of the additives of the present invention are applicable to other metals, including ferrous metals and their alloys.

The preferred class of polymeric polycarboxylates are based on polyacrylic acid (PAA) and/or polymaleic acid (PMA). These polymeric polycarboxylates are compatible with other components in the typical antifreeze/coolant composition, and present no additional toxicity or disposal concerns.

The molecular weight distribution of useful materials may average about one hundred grams/mole to about three million grams/mole. Chemically, the materials should be based on polymers and copolymers of acrylic acid and maleic acid, including many modifiers such as alcohols.

More specifically, the polycarboxylates used in the present invention have a molecular weight range of from about 500 to about 250,000, with a preferred range of from 500 to 12,000. More specifically, the most preferred additives have average molecular weights in the range of about 500 to about 4,000, and more specifically about 1,300 to about 1,800 and about 300 to about 4,600.

When reference is made to polycarboxylates within the context of the present invention it is understood to encompass those water-soluble homo- and copolymers having at least one monomeric unit containing $C_{3-6}$ monoethylenically unsaturated mono- or dicarboxylic acids or their salts. Suitable monocarboxylic acids of this type are for example, acrylic acid, methacrylic acid, ethacrylic acid, vinylacetic acid, allylacetic acid, and crotonic acid. The preferable monocarboxylic acids from this group are acrylic acid and methacrylic acid. A further component of the polycarboxylate comprises monoethylenically unsaturated $C_{4-6}$ dicarboxylic acids, for example, maleic acid, itaconic acid, citraconic acid, mesaconic acid, fumaric acid, or methylenemalonic acid. The preferred acid is maleic acid. One of the most preferred polycarboxylates is a 1:1 copolymer of maleic acid or its sodium salt and an olefin.

Other organic substituents may be used as comonomers or as modifiers added along the polymer chain. Examples of such are shown as Formula I.

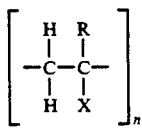

where R=H or a secondary alcohol such as isopropanol, X=COOH, COO. Na+, methylvinylether, isobutylene, vinyl acetate, acrylamide, or styrene, with the proviso that when R=a secondary alcohol, X=COOH or COO Na+, and when X=any other above referenced group, R=H. The preferred polycarboxylates are a copolymer of polyacrylic acid and maleic acid, or the sodium salts thereof, said polymer having a molecular weight of 8000, and a sodium salt of polyacrylic acid modified with a secondary alcohol such as isopropanol, said polymer having a molecular weight of 4000.

The polycarboxylates used in the present invention are obtained by methods well known to those skilled in the art. The general method of synthesis is via free acid radical polymerization. The polymerization may be carried out in an aqueous medium, in the presence of polymerization initiators, with or without regulants. The polymerization can take various forms; for example, the monomer(s) can be polymerized batchwise in the form of aqueous solutions. It is also possible to introduce into the polymerization reactor a portion of the monomer(s) and a portion of the initiator, to heat the mixture in an inert atmosphere to the polymerization temperature and then to add the remaining monomer(s) and initiator to the reactor at the rate of polymerization. Polymerization temperatures range from 20° C. to 200° C. At temperatures above 100° C., pressure vessels are employed.

The carboxyl containing monomers can be polymerized in the free carboxylic acid form, in the partial neutralized form, or completely neutralized. The neutralization is preferably effected with alkali metal or ammonium base.

The polymerization initiators used are preferably water soluble free radical formers such as hydrogen peroxide, peroxodisulfates and mixtures of the two. The polymerization may also be started with water insoluble initiators such as dibenzoyl peroxide, dilaurylperoxide, or azodiisobutyronitrile. The polymerization may be carried out in the presence of regulants. Examples of such regulants include water soluble mercaptans, ammonium formate, and hydroxylammonium sulfate.

Examples of the polycarboxylates are most preferred in the present invention are those marketed by BASF under the trademark SOKALAN ® polycarboxylates, which are available in aqueous polymer solutions.

Other materials which are useful in the present invention include Belclene water treatment additives from Ciba-Geigy, Colloid additives from Colloids, Inc., Good-rite polyacrylates and Carbopol resins from BF Goodrich and the like.

The polymeric polycarboxylate is effective at relatively low concentrations, generally about 100 to about 1000 ppm per total volume of antifreeze/coolant.

While the particularly preferred additive, a polymeric polycarboxylate such as Sokalan ® CP 10 S, has been shown to be particularly effective at about 0.15 weight percent in a silicate-phosphate type coolant in reducing hot surface aluminum corrosion, other levels of additive and different polycarboxylates are also useful.

In addition to silicate-phosphate type coolants, these additives are useful in silicate-borax, amine-phosphate, amine-borax, organic acid-phosphate organic acid-borax type coolants, and the like.

The most preferred antifreeze/coolant composition is a silicate-phosphate type having a pH of about 10.5 and having about 94% antifreeze grade glycols and about 3% corrosion inhibitors, with the balance being water. While ethylene glycol is the preferred glycol, propylene glycol or mixtures of propylene glycol and ethylene glycol may also be used. The corrosion inhibitors generally are a mixture of azole compounds, nitrate salts, defoamers and other constituents in addition to the stabilized silicate and phosphate salts. The stabilized silicate technology is disclosed in U.S. Pat. Nos. 4,370,255; 4,362,644 and 4,354,002, all hereby incorporated by reference. Antifreeze/coolant compositions are well-known in the art and many variations of the above-described composition will be useful in the invention.

The following examples serve to further illustrate the present invention and should in no way be construed as limiting the scope thereof.

EXAMPLES

ASTM D2809-83 is the standard test method for Cavitation Erosion-Corrosion Characteristics of Aluminum Pumps with Engine Coolants. This test was selected as a method to investigate the utility of polycarboxylates as cavitation erosion-corrosion inhibitors for aluminum. ASTM D2809-83 simulates the real world operating conditions of aluminum.

A silicate-phosphate based antifreeze/coolant of pH 10.5 was selected for testing. The coolant is 94% antifreeze grade glycols, 3% corrosion inhibitors and 3% water. The corrosion inhibitors included nitrate salts, azole compounds, defoamer, caustic soda and alkali metal phosphates. Also included were stabilized silicate copolymers of the type discussed in U.S. Pat. Nos. 4,370,255 4,362,644 and 4,354,002, all of which are hereby incorporated by reference.

To the above-described base coolant, the polycarboxylate additives of the present invention were added at 0.03 and 0.15 weight percents. The ASTM D2809-83 standard test was extended beyond the normal 100 hour evaluation to include additional ratings at 300, 600 and 1000 hours, in some cases. A rating of 10 is perfect, while a rating of 1 indicates perforation of the pump. Two coolants were used in this test. Coolant 1 is Sokalan ® CP12 S and Coolant 2 is Sokalan ® CP 10 S. The results of this test is shown in Table 1.

TABLE 1

| Test Period (Hours) | Coolant (Base) | Coolant 1 (0.03) | Coolant 2 (0.15) | Coolant 2 (0.03) |
|---|---|---|---|---|
| 100 | 9.5 | 10.0 | 9.8 | 9.2 |
| 300 | 8.5 | 9.8 | 9.8 | 9.2 |
| 600 | 7.5 | 9.8 | — | — |

TABLE 1-continued

| Test Period (Hours) | Coolant (Base) | Coolant 1 (0.03) | Coolant 2 (0.15) | Coolant 2 (0.03) |
| --- | --- | --- | --- | --- |
| 1000 | 7.0 | 9.3 | — | — |

The aluminum water pump, casting and impeller were rated separately and the numerical average calculated for coolants containing additives in Table 1. The ASTM specification for passing is a rating of an 8.0 for 100 hours.

Table 2 shows the percent change with time for the coolants with additives versus the base coolant. Positive numbers indicate improvement while negative numbers indicate a rating drop.

TABLE 2

| Test Period (Hours) | Coolant 1 (0.03) | Coolant 2 (0.15) | Coolant 2 (0.03) |
| --- | --- | --- | --- |
| 100 | 5 | 3 | −3 |
| 300 | 13 | 13 | 8 |
| 600 | 24 | — | — |
| 1000 | 25 | — | — |

From Table 1, it can be seen that the polycarboxylate additives improve the cavitation erosion-corrosion performance relative to the base coolant. The improvement is greatest at the longer test points. This improvement is also seen in the results from Table 2.

Both Table 1 and Table 2 shows that Coolant 1 (0.03 wt.% Sokalan ® CP 12 S is superior to Coolant 2 (Sokalan ® CP 10 S at 0.03 and 0.15 wt.%). However, both additives have significantly improved performance over the base coolant. Increasing the level of additive (Coolant 2) by three times provides and equivalent performance to Coolant 1.

Table 3 shows the effect of pH on the ability of the additive to prevent cavitation erosion-corrosion. In this example, the pH of the Coolant 2 with 0.15 wt.% additive was dropped from 10.5 to 8.5 and the ASTM D2809-83 test was performed. The results from this test were compared with the data from Table 1 for the base coolant (pH 10.5) and coolant at 0.15 wt.% additive (pH 10.5).

TABLE 3

| Test Period (Hours) | Coolant (pH 10.5) | Coolant 2 (pH 10.5) | Coolant 2 (pH 8.5) |
| --- | --- | --- | --- |
| 100 | 9.5 | 9.8 | 9.5 |
| 300 | 8.5 | 9.8 | 9.5 |
| 600 | 7.5 | — | 9.3 |
| 1000 | 7.0 | — | 9.0 |

Table 3 shows that the additive is beneficial at lower pH beyond 100 hours. At 1000 hours, it improved the base coolant by 2 rating points. Further, the additive is only slightly less effective at pH 8.5 than at pH 10.5 at 100 and 300 hours. It is believed that this small variance would continue at longer test periods.

Whereas particular embodiments of the invention have been described above for purposes of illustration, it will be appreciated by those skilled in the art that numerous variations of the details may be made without departing from the invention as described in the appended claims.

What is claimed is:

1. A glycol-based automotive antifreeze/coolant solution which resists the cavitation errosion-corrosion of aluminum or aluminum alloys including a cavitation errosion-corrosion rate reducing effective amount of a polycarboxylate additive which is at least one of (i) a sodium salt of a copolymer of acrylic acid and maleic acid, and (ii) a secondary alcohol modified polyacrylic acid.

2. A glycol-based automotive antifreeze/coolant solution as in claim 1, wherein said polycarboxylate is a sodium salt of a secondary alcohol modified polyacrylic acid.

3. A glycol-based automotive antifreeze/coolant solution as in claim 1 or 2, wherein said polycarboxylate additive is present in an amount of about 10 to 1000 ppm total volume of the antifreeze/coolant solution.

4. A glycol-based automotive antifreeze/coolant solution as in claim 3, wherein said polycarboxylate has a molecular weight range of from about 500 to about 250,000.

5. A glycol-based automotive antifreeze/coolant solution as in claim 1, wherein said polycarboxylate is a sodium salt of an acrylic acid/maleic acid copolymer having a molecular weight of 3000.

6. A glycol-based automotive antifreeze/coolant solution as in claim 1, wherein said polycarboxylate is a polyacrylic acid modified with an aliphatic secondary alcohol.

7. A glycol-based automotive antifreeze/coolant solution as in claim 6, wherein said polycarboxylate is a sodium salt of a polyacrylic acid modified with an aliphatic secondary alcohol having a molecular weight of 4000.

8. A glycol-based automotive antifreeze/coolant solution as in claim 6 or 7, wherein said aliphatic secondary alcohol is isopropanol.

* * * * *